US011165565B2

(12) United States Patent
Belenko

(10) Patent No.: US 11,165,565 B2
(45) Date of Patent: Nov. 2, 2021

(54) SECURE DISTRIBUTION PRIVATE KEYS FOR USE BY UNTRUSTED CODE

(71) Applicant: Microsoft Technology Licensing, LLC, Redmond, WA (US)

(72) Inventor: Andrey Belenko, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 15/375,066

(22) Filed: Dec. 9, 2016

(65) Prior Publication Data
US 2018/0167203 A1    Jun. 14, 2018

(51) Int. Cl.
*H04L 9/08*      (2006.01)
*H04L 29/06*     (2006.01)
(Continued)

(52) U.S. Cl.
CPC .......... *H04L 9/0822* (2013.01); *H04L 9/083* (2013.01); *H04L 9/0877* (2013.01); *H04L 9/14* (2013.01);
(Continued)

(58) Field of Classification Search
CPC ..... H04L 9/0822; H04L 9/083; H04L 9/0877; H04L 9/14; H04L 9/3234; H04L 9/3242;
(Continued)

(56) References Cited

U.S. PATENT DOCUMENTS 7,194,634 B2    3/2007  Ellison et al.
7,562,220 B2    7/2009  Frank et al.
(Continued)

FOREIGN PATENT DOCUMENTS

| CN | 1708003 A | 12/2005 |
|----|-----------|---------|
| CN | 105450406 A | 3/2016 |
| WO | 2013089771 A1 | 6/2013 |

OTHER PUBLICATIONS

M, et al., "Intel Software Guard Extensions Tutorial Series: Part 1, Intel SGX Foundation," https://software.intel.com/en-us/articles/intel-software-guard-extensions-tutorial-part-1-foundation, Published on: Jul. 7, 2016, 4 pages.
(Continued)

*Primary Examiner* — Samson B Lemma
*Assistant Examiner* — Zoha Piyadehghibi Tafaghodi
(74) *Attorney, Agent, or Firm* — Dicke, Billig & Czaja, PLLC

(57) ABSTRACT

A secure key system is described that distributes a private key of a key server to an edge server for encryption on behalf of an owner of the private key when establishing a session with a client. To distribute the private key, the key server receives from the edge server a quote generated by a secure enclave of the edge server. The quote attests to code of the secure enclave. The key server verifies the quote to ensure that the code of the secure enclave is trusted code. The key server encrypts the private key using a key of the edge server and sends the encrypted private key to the code of the secure enclave. The code of the secure enclave decrypts the private key using its key. Untrusted code of the edge server then requests the code of the secure enclave to perform cryptographic actions using the private key.

51 Claims, 5 Drawing Sheets

(51) Int. Cl.
*H04L 9/14* (2006.01)
*H04L 9/32* (2006.01)

(52) U.S. Cl.
CPC .......... *H04L 9/3234* (2013.01); *H04L 9/3242* (2013.01); *H04L 9/3247* (2013.01); *H04L 9/3263* (2013.01); *H04L 63/0435* (2013.01); *H04L 63/166* (2013.01)

(58) Field of Classification Search
CPC . H04L 9/3247; H04L 9/3263; H04L 63/0435; H04L 63/166
USPC ....................................................... 713/155
See application file for complete search history.

(56) References Cited

U.S. PATENT DOCUMENTS

| | | | |
|---|---|---|---|
| 8,438,658 B2 | 5/2013 | Hofstee et al. | |
| 8,701,205 B2 | 4/2014 | Shah et al. | |
| 9,413,538 B2* | 8/2016 | Baumann | G06F 21/577 |
| 2004/0093419 A1* | 5/2004 | Weihl | H04L 63/06 709/229 |
| 2012/0246470 A1 | 9/2012 | Nicolson et al. | |
| 2014/0164776 A1* | 6/2014 | Hook | H04L 9/14 713/171 |
| 2014/0310526 A1* | 10/2014 | Pahl | H04L 9/0825 713/171 |
| 2015/0244711 A1 | 8/2015 | Venkataraman et al. | |
| 2015/0249651 A1* | 9/2015 | Okamoto | H04L 63/08 713/171 |
| 2015/0304736 A1 | 10/2015 | Lal et al. | |
| 2015/0347768 A1 | 12/2015 | Martin et al. | |
| 2016/0006754 A1 | 1/2016 | Woodward et al. | |
| 2016/0054989 A1* | 2/2016 | Diebolt | H04L 63/12 717/177 |
| 2016/0105279 A1* | 4/2016 | Zheng | H04L 9/0825 713/171 |
| 2016/0173280 A1* | 6/2016 | Tribble | H04L 63/0435 713/153 |
| 2016/0188889 A1* | 6/2016 | Narendra Trivedi | G06F 21/6218 713/189 |
| 2016/0196218 A1* | 7/2016 | Kumar | G06F 11/1464 713/193 |
| 2016/0286391 A1* | 9/2016 | Khan | H04W 12/0609 |
| 2016/0350534 A1 | 12/2016 | Poornachandran et al. | |
| 2017/0041147 A1* | 2/2017 | Krahn | H04L 9/0897 |

OTHER PUBLICATIONS

"Spyware Resistant Web Authentication Using Virtual Machines," https://crypto.stanford.edu/SpyBlock/spyblock-2.pdf, Retrieved on: Oct. 5, 2016, 19 pages.

Sullivan, Nick, "Keyless SSL: The Nifty Gritty Technical Details," https://blog.cloudflare.com/keyless-ssl-the-nitty-gritty-technical-details/, Published on: Sep. 19, 2014, 14 pages.

Hallam-Baker, P., "Limited Use of Remote Keys, Protocol and Reference," https://tools.ietf.org/html/draft-hallambaker-lurk-00, Published on: Mar. 18, 2016, 1-31 pages.

"Intel Software Guard Extensions," https://software.intel.com/en-us/sgx, Retrieved on: Oct. 12, 2016, 2 pages.

Publication Data for "SecureKeeper: Confidential ZooKeeper using Intel SGX", Retrieved from <<https://dl.acm.org/citation.cfm?id=2988350>>, Dec. 12, 2016, 2 Pages.

"International Search Report and Written Opinion Issued in PCT Application No. PCT/US2017/064791", dated Feb. 19, 2018, 12 Pages.

Brenner, et al., "SecureKeeper: Confidential ZooKeeper using Intel SGX", In the Proceedings of the 17th International Middleware Conference, Dec. 12, 2016, 13 Pages.

"Office Action Issued in European Patent Application No. 17829065.6", dated May 7, 2020, 7 Pages.

"Office Action Issued in European Patent Application No. 17829065.6", dated Oct. 2, 2020, 04 Pages.

"First Office Action and Search Report Issued in Chinese Patent Application No. 201780074954.9", dated Apr. 27, 2021, 25 Pages.

* cited by examiner

SECURE DISTRIBUTION PRIVATE KEYS FOR USE BY UNTRUSTED CODE

BACKGROUND

Transport Layer Security ("TLS") is a cryptographic protocol that is used extensively to communicate securely via the Internet. TLS ensures the privacy and integrity of the communications and the authenticity of the communicating parties. The privacy of the communications is ensured because each communication (or message) is encrypted with a symmetric key known only to the communicating parties. The integrity is ensured using a message authentication code. The authenticity of a communicating party is ensured using a public/private key pair.

A client establishes a TLS session with a server by initially sending to the server a message that includes a "client random." In response, the server responds with a "server random" and a public key certificate. The client random and the server random are random numbers generated by the client and the server, respectively, although the randoms may include a time stamp. The public key certificate includes the public key of the server along with the public key certificate of the server. The client then sends to the server a "pre-master secret" that is encrypted using the public key. The pre-master secret is a blob of data, which may be generated from the client random and the server random. The client then creates a TLS session key from the client random, the server random, and the pre-master secret using an algorithm. When the server receives the pre-master secret, the server decrypts it with its private key. The server then creates a TLS session key from the client random, the server random, and the pre-master secret using the same algorithm. The client and server can then communicate securely by encrypting and decrypting communications using their own copy of the TLS session key, which is a symmetric key.

Some organizations (e.g., news organizations and e-commerce companies) that want to provide content to their users (e.g., subscribers) may contract to have an intermediary distribute the content to the users. A content delivery network ("CDN") is an example of such an intermediary. A CDN is a distributed network of proxy servers that may be deployed globally. A CDN may have edge servers connected to servers via a high-speed communications backbone. The connected servers may be CDN servers that host content of customers or may be customer servers that host the content. The edge servers establish TLS sessions with the users on behalf of customers. Once a TLS session is established for a customer and a user, the CDN provides content of the customer to the user. A CDN may cache content at the edge servers to improve response time when serving content.

When a TLS session is established on behalf of a customer, the edge server needs to send to the client (i.e., a device of the user) the public key certificate of its customer and needs to have the pre-master secret decrypted with the private key of its customer. It can be risky for an edge server to store the private keys of its customers. If even one edge server is compromised (e.g., by a cyberattack), all the private keys may be stolen.

One technique to avoid this risk of a compromised edge server is to not store any private keys of customers on the edge servers. When a pre-master secret needs to be decrypted by a private key of a customer, the edge server sends to a key server of the customer a request to decrypt the pre-master secret that is included in the request. The key server of the customer decrypts the pre-master secret and sends the decrypted pre-master secret via a secure channel to the edge server. Although this technique avoids the risk of a compromised edge server, the technique requires roundtrip communications with the key server for each TLS session that is established, which is costly in terms of money and computational resources and delays the establishing of the TLS sessions.

SUMMARY

A secure key system is described in which a first device provides a first key of the first device to a second device for performing a cryptographic action on behalf of an owner of the first key. In some embodiments, the first device receives from the second device a quote generated by a secure enclave. The quote attests to code of the secure enclave and to a second key of the second device. The first device verifies the quote to ensure that the code of the secure enclave is trusted code and the second key is for the secure enclave. The first device encrypts the first key using a second key of the second device. After the quote is verified, the first device sends to the second device the encrypted first key.

In some embodiments, the second device, under control of a secure enclave of the second device, generates the quote and directs that the quote and the second key be sent to the first device. The second device then receives from the first device the first key of the first device, which is encrypted with the second key of the second device. The second device then decrypts the first key based on encryption with the second key and stores the decrypted first key within the secure enclave so that the decrypted first key is not accessible outside of the secure enclave. Untrusted code of the second device executing outside of the secure enclave then requests the trusted code of the secure enclave to perform a cryptographic action on data using the first key and to provide the resulting data to the untrusted code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
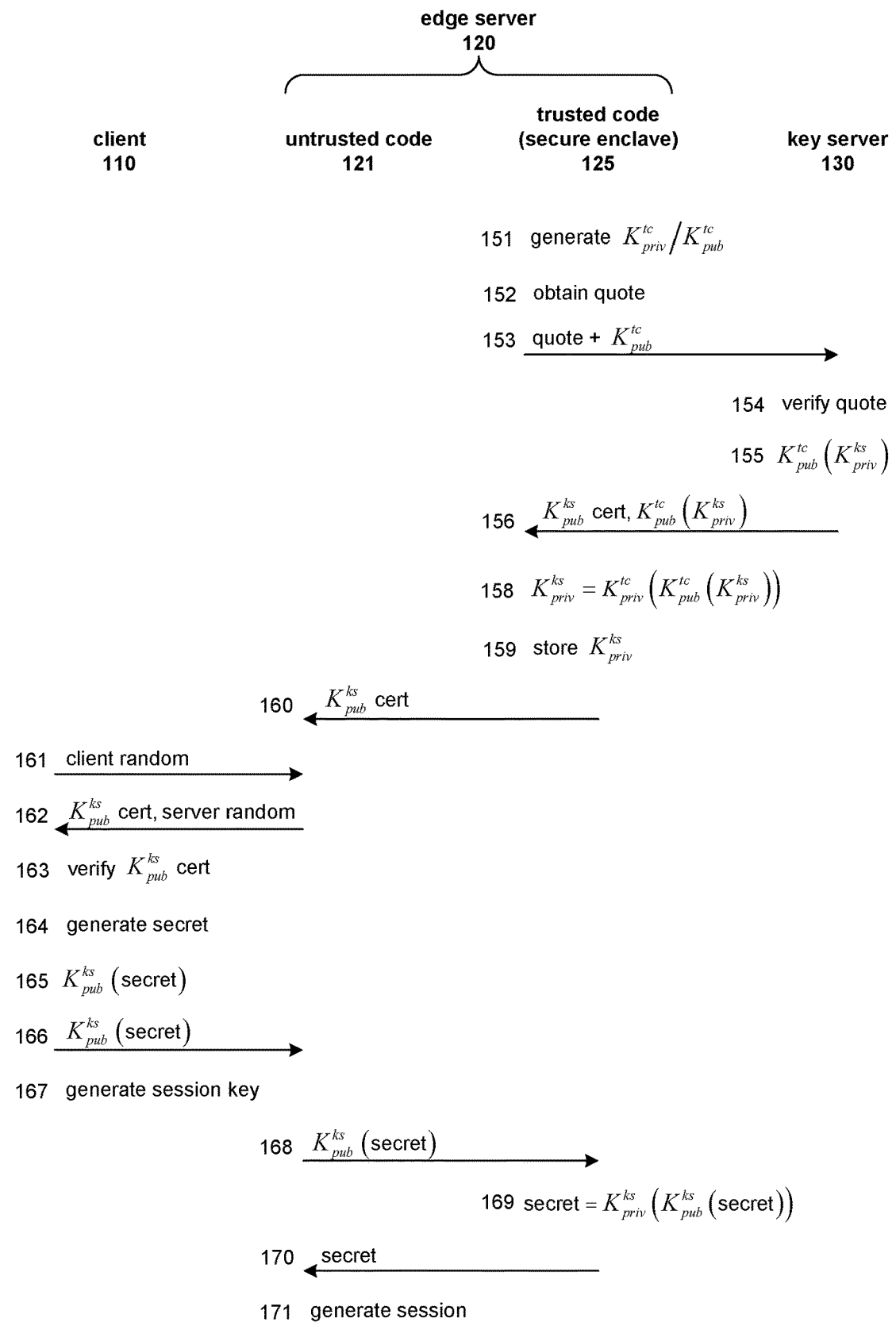
FIG. 1 is a diagram that illustrates processing that employs aspects of a secure key system in some embodiments.

A method and system are described for securely distributing keys and securely using the distributed keys. In some embodiments, a secure key system provides a first key (e.g., a private key) of a first device to a second (or intermediary)

device for performing a cryptographic action (e.g., encrypt data or decrypt data) on data on behalf of the owner of the first key to generate resulting data (e.g., encrypted data or decrypted data). For example, the first key may be a private key of a public/private key pair, the first device may be a key server of the owner of the private key who is a customer of a CDN, and the second device may be an edge server of the CDN. To distribute a key, the first device receives from the second device a quote generated by a secure enclave of the second device. A secure enclave is a hardware feature of a processor that controls the execution of trusted code, protects both the trusted code and its data, and provides an attestation, referred to as a "quote," as to the code that it is executing. A secure enclave of a processor may retrieve from main memory encrypted trusted code and encrypted data, decrypt the trusted code and the data, and store the decrypted trusted code and data in memory that is accessible only by the secure enclave. The secure enclave then executes the trusted code. The secure enclave may have a public/private key pair and include in the quote a hash of the trusted code that is encrypted with its private key. An example of a secure enclave is the Software Guard Extension Enclave of Intel Corporation. The second device also has untrusted code that executes outside of the secure enclave. The term "trusted code" refers to code that executes within a secure enclave, and the term "untrusted code" refers to code that executes outside of a secure enclave. Untrusted code is untrusted in the sense that it is more susceptible to being compromised than trusted code.

After the first device receives the quote sent by the second device, the first device verifies the quote to ensure that the code of the secure enclave is the trusted code that the first device expects the secure enclave to be executing. After the quote is verified, the first device sends to the second device the first key, which is encrypted with a second key of the trusted code of the second device. For example, the second key may be a public key of a public/private key pair of the CDN, the trusted code may have the private key, and the key server may have access to the public key certificate. As another example, the second key may be a symmetric key that is shared by the trusted code and the key server. Upon receiving the encrypted first key of the first device, the trusted code of the second device decrypts the first key of the first device with the second key and securely stores the first key of the first device in the secure enclave of the second device. Subsequently, the untrusted code of the second device can request the trusted code to encrypt or decrypt data using the first key of the first device. In this way, the first key of the first device can be securely stored by the secure enclave of the second device and used to encrypt and decrypt data. As such, the first key of the first device is protected from the risk of untrusted code that executes on the second device stealing the first key of the first device.

In some embodiments, an edge server of a CDN, when initializing, directs its secure enclave to load trusted code. The secure enclave can then generate a quote attesting to the trusted code that has been loaded. The trusted code can then direct untrusted code of the edge server to send the quote to a key server of a customer. In response, the edge server receives the encrypted private key of the customer, and the untrusted code provides the encrypt private key to the trusted code. The trusted code then decrypts the private key of the customer with its private key (or shared symmetric key) and securely stores the decrypted private key of the customer. During the process of establishing a TLS session with a user of the customer, the untrusted code of the edge server requests the trusted code of the secure enclave to decrypt the pre-master secret, which has been encrypted with the public key of the customer. Upon receiving the encrypted pre-master secret, the trusted code decrypts the pre-master secret with the private key of the customer and provides the decrypted pre-master secret to the untrusted code. The untrusted code can then generate the session key using the decrypted pre-master secret. Once the private key of the customer is securely stored in the secure enclave, the untrusted code can repeatedly establish TLS sessions with users of the customer by relying on the trusted code of the secure enclave to decrypt the pre-master secrets. In this way, TLS sessions can be established without requiring roundtrip communications with a key server of the customer for each TLS session. Also, the private keys of the customers of the CDN can be securely stored by the secure enclave of each edge server.

FIG. 1 is a diagram that illustrates processing that employs aspects of a secure key system in some embodiments. A client 110, an edge server 120, and a key server 130 interact to securely store a private key of the key server at the edge server and to establish a TLS session with the client. The edge server includes untrusted code 121 and trusted code 125. The trusted code is executed by the secure enclave, and the untrusted code coordinates the establishing of the TLS session and provides other edge server functions, such as delivering content. In steps 151-159, the trusted code interacts with the key server to obtain the private key of the key server. In step 151, the trusted code may generate a public/private key pair $K_{priv}^{tc}/K_{pub}^{tc}$. In step 152, the trusted code (or untrusted code) obtains a quote from the secure enclave attesting to the trusted code and the public key $K_{pub}^{tc}$. In step 153, the trusted code directs that the quote and the public key $K_{pub}^{tc}$ be sent to the key server. In step 154, the key server verifies the quote to ensure that the expected trusted code is executing in the secure enclave and to ensure that the public key $K_{pub}^{tc}$ was provided (e.g., generated or obtained) by the trusted code executing in the secure enclave. In step 155, the key server encrypts the private key $K_{priv}^{tc}$ of the key server with the public key $K_{pub}^{tc}$ of the trusted code. In step 156, the key server sends the encrypted private key $K_{priv}^{ks}$ of the key server and, optionally, a public key $K_{priv}^{ks}$ certificate of the key server to the trusted code. In step 158, the trusted code decrypts the encrypted private key $K_{priv}^{ks}$ of the key server with the private key $K_{priv}^{tc}$ of the trusted code. In step 159, the trusted code stores the decrypted private key $K_{priv}^{ks}$ of the key server in the secure enclave. In step 160, the trusted code may provide the public key $K_{pub}^{ks}$ certificate of the key server to the untrusted code for providing to clients of the customer's users.

At a later time, in steps 161-171, a TLS session is established for a user of the customer. In step 161, a client sends to the untrusted code a request that includes a client random to establish a TLS session with the customer of the CDN. In step 162, the untrusted code responds by sending to the client a server random and the public key $K_{pub}^{ks}$ certificate of the key server. In step 163, upon receiving the public key $K_{pub}^{ks}$ certificate of the key server, the client verifies that the certificate is for the public key $K_{pub}^{ks}$ of the key server. In step 164, the client generates a pre-master secret. In step 165, the client encrypts the pre-master secret with the public key $K_{pub}^{ks}$ of the key server. In step 166, the client sends the encrypted pre-master secret to the untrusted code. In step 167, the client generates the session key using the client random, the server random, and the pre-master session. In step 168, upon receiving the encrypted pre-master secret, the untrusted code requests the trusted code of the secure enclave to decrypt the pre-master secret. In step 169, the trusted code decrypts the pre-master secret using the private key $K_{priv}^{ks}$ of the key server. In step 170, the trusted code provides the decrypted pre-master secret to the untrusted code. In step 171, the untrusted code generates a session key using the client random, the server random, and the pre-master secret. The client and the untrusted code then use their respective copies of the session key to encrypt communications of the TLS session. Alternatively, the untrusted code may provide the encrypted pre-master secret along with the server random and the client random to the trusted code. In such a case, the trusted code decrypts the pre-master secret and generates and stores the session key. When the untrusted code needs to encrypt or decrypt a communication of the TLS session, the untrusted code requests the trusted code to encrypt or decrypt the communication using the session key.

In some embodiments, the secure key system may employ various security techniques when a compromised criterion is satisfied. A compromised criterion may be satisfied when a CDN has been compromised in some way. For example, a security agent of a CDN may report to a key server when it determines that an edge server has been compromised (e.g., infected with a virus).

One security technique employs a private key renewal process to ensure that trusted code of an edge server stops using a private key if the untrusted code of the edge server is compromised. The trusted code of an edge server that has a private key of a key server may (periodically) send to the key server a renewal request for the private key. If the compromised criterion is not satisfied for an edge server (e.g., as reported by a security agent), the key server sends to the trusted code of the edge server a notification of renewal. Upon receiving the notification, the trusted code continues to use the private key of the key server. If the compromised criterion is satisfied for the edge server, the key server suppresses the sending of a notification of renewal. If the trusted code of the edge server does not receive a notification of renewal, the trusted code stops using the private key.

Another security technique employs a password renewal process to ensure that trusted code of an edge server stops using a private key if the untrusted code of the edge server is compromised. Although described as a "password" renewal process, the renewal process can be used with other types of credentials, such as digital signatures, tokens, certificates, and so on. The trusted code of a secure enclave may be provisioned with an access password that is to be provided by untrusted code when requesting the trusted code to decrypt or encrypt with the private key. When the untrusted code proffers a password that matches the access password, the trusted code performs the encryption/decryption using the private key. The trusted code may (periodically) request the key server that provided the private key to confirm that the access password is still valid. If the compromised criterion is not satisfied, the key server sends a confirmation. Upon receiving the confirmation, the trusted code continues to use the access password. If the compromised criterion is satisfied, the key server suppresses the sending of a confirmation. If a confirmation is not received by the trusted code of the edge server, the trusted code stops using the access password so that a subsequent encryption/decryption request from untrusted code that proffers the access password will be denied.

In some embodiments, a CDN may have multiple edge servers that each can accept a TLS ticket to resume a session. In such a case, the session key of a key server may be distributed to each of the edge servers so that each edge server can accept the ticket regardless of which edge server generated the ticket.

In some embodiments, the secure key system may be used for distributing a private key of a first device to second device for any use of the private key by the first device. For example, the secure key system is described primarily as supporting RSA-based TLS handshake that relies on RSA encryption to obtain the pre-master secret that is used to generate the session key. The secure key system may also be used with a TLS handshake that relies on a Diffe-Hellman Ephemeral ("DHE") or an Elliptic Curve Diffie-Hellman Ephemeral ("ECDHE") key exchange.

Figure 2:
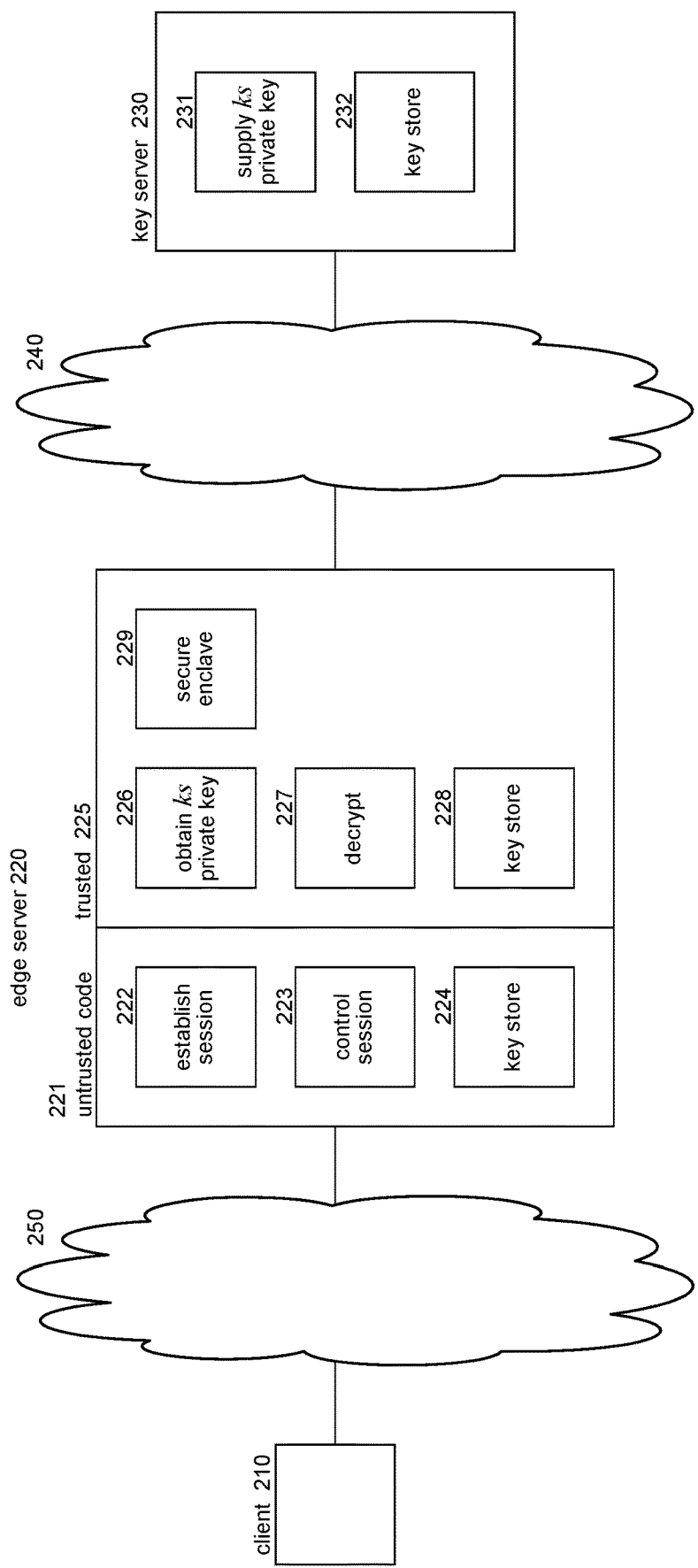
FIG. 2 is a block diagram that illustrates components of computer systems that employ the secure key system in some embodiments.

FIG. 2 is a block diagram that illustrates components of computer systems that employ the secure key system in some embodiments. An edge server 220 of a CDN communicates via a communications channel 250 with a client 210 of a user of the customer. The edge server communicates with a key server 230 of the customer via a communications channel 240. The client, the edge server, and the key server are computing devices. The communications channels may be the Internet, a cellular network, a wide area network, and so on. The edge server 220 includes untrusted code 221 and trusted code 225. The trusted code executes in a secure enclave 229 of a processor of the edge server. The untrusted code includes an establish session component 222, a control session component 223, and a key store 224. The establish session component coordinates the establishing of TLS sessions with clients relying on the trusted code to decrypt data with the private key of the key server. The control session component controls the TLS session after it has been established. The key store 224 may be used to store the session key for the TLS session. The trusted code includes an obtain key server private key component 226, a decrypt component 227, and a key store 228. The obtain key server private key component coordinates the obtaining and secure storing of the private key of the key server in the key store 228, which is part of the secure enclave. The decrypt component is responsible for decrypting the pre-master secrets of TLS sessions. The key server includes a supply key server private key component 231 and a key store 232. The supply key server private key component coordinates the providing of the private key of the key server, which is stored in the key store 232, to the trusted code of the edge server.

The computing systems of a client, an edge server, and a key server that employ the secure key system may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the secure key system. The data transmission media are used for transmitting data via transitory, propagating signals or carrier waves (e.g., electromagnetism) via a wired or wireless connection.

The secure key system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the secure key system may be implemented in hardware using, for example, an application-specific integrated circuit (ASIC).

Figure 3:
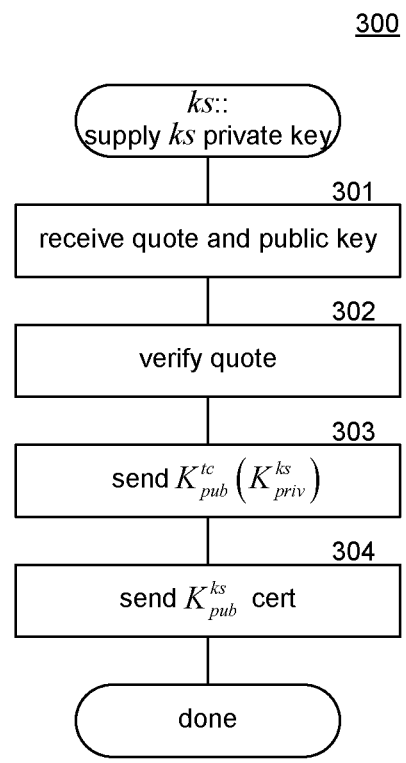
FIG. 3 is a flow diagram that illustrates the processing of a supply key server private key component of the secure key system in some embodiments.

FIG. 3 is a flow diagram that illustrates the processing of a supply key server private key component of the secure key system in some embodiments. A supply key server private key component 300 coordinates the supplying of a private key of the key server to edge servers. In block 301, the component receives from an edge server a quote and a public key of a secure enclave of the edge server. The quote attests to the trusted code and the public key. In block 302, the component verifies that the quote is for the expected trusted code and the received public key. Assuming that the quote is verified, in block 303, the component sends to the trusted code the private key of the key server encrypted with the public key of the trusted code. In block 304, the component may send a public key of the key server to the trusted code, and it then completes. In some embodiments, the public keys employed by the secure key system may be obtained prior to and/or from various other sources, such as a certificate authority.

Figure 4:
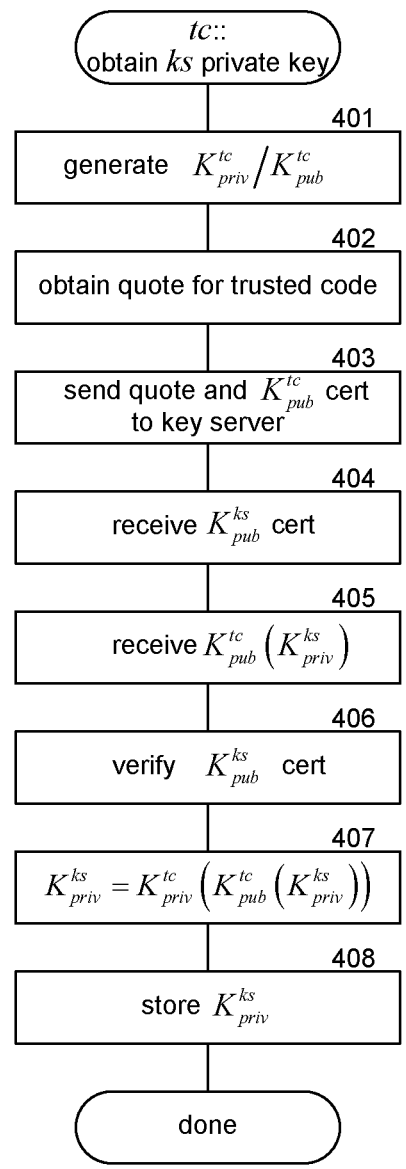
FIG. 4 is a flow diagram that illustrates the processing of an obtain key server private key component of trusted code of the secure key system in some embodiments.

FIG. 4 is a flow diagram that illustrates the processing of an obtain key server private key component of trusted code of the secure key system in some embodiments. An obtain key server private key component 400 executes in a secure enclave and coordinates the obtaining of a private key from a key server. In block 401, the component generates or otherwise obtains a public/private key pair for the trusted code. The public/private key pair may be ephemeral in the sense that is generated and only used to obtain one private key of a key server. In block 402, the component obtains a quote from the secure enclave for the trusted code and the public key for the trusted code. In block 403, the component sends the quote and a public key certificate of the trusted code to the key server. In block 404, the component may receive a public key certificate of the key server. In block 405, the component receives from the key server the private key of the key server encrypted with the public key of the trusted code. In block 406, the component verifies the public key certificate of the key server. Assuming that the certificate is verified, in block 407, the component decrypts the private key of the key server using the private key of the trusted code. In block 408, the component stores the decrypted private key of the key server securely within the secure enclave and then completes.

Figure 5:
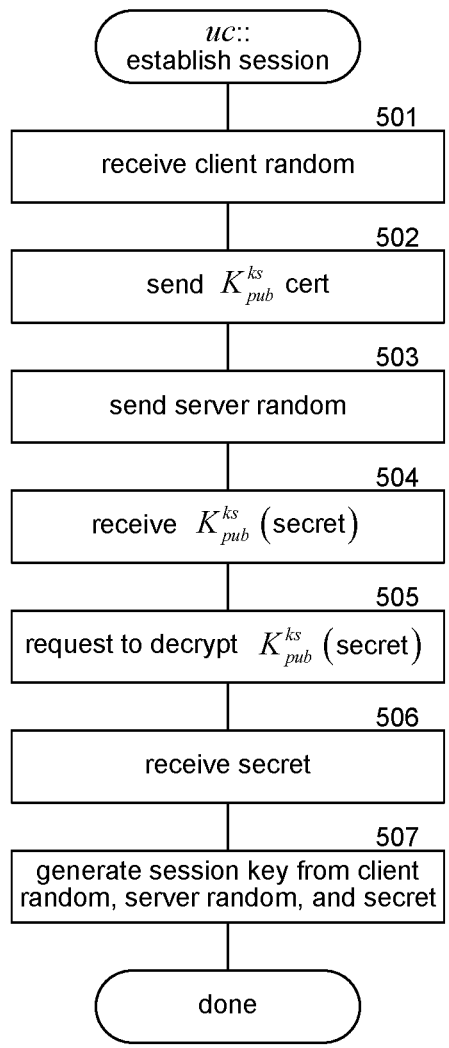
FIG. 5 is a flow diagram that illustrates the processing of an establish session component of untrusted code of the secure key system in some embodiments.

FIG. 5 is a flow diagram that illustrates the processing of an establish session component of untrusted code of the secure key system in some embodiments. An establish session component 500 controls the establishing of a TLS session with a client on behalf of a customer of a CDN. In block 501, the component receives from a client a request to establish a TLS session that includes a client random. In block 502, the component sends to the client a public key certificate of the key server. In block 503, the component sends to the client a server random. In block 504, the component receives a pre-master secret encrypted with the public key of the key server. In block 505, the component requests the trusted code to decrypt the encrypted pre-master secret. In block 506, the component receives from the trusted code the decrypted pre-master secret. In block 507, the component generates a session key using the client random, the server random, and the pre-master secret. The component then completes. The untrusted code can then control the TLS session encrypting communications with the session key.

The following paragraphs describe various embodiments of aspects of the secure key system. An implementation of the secure key system may employ any combination of the embodiments. The processing described below may be performed by a computing device with a processor that executes computer-executable instructions stored on a computer-readable storage medium that implements the secure key system.

In some embodiments, a method performed by a computing system for providing a first key of a first device to a second device for performing a cryptographic action on behalf of an owner of the first key is provided. The method accesses a second key of the second device. The method receives receiving from the second device a quote generated by a secure enclave. The quote attests to code of the secure enclave. The method verifies the quote to ensure that the code of the secure enclave is trusted code. The method encrypts encrypting the first key using the second key. The method, after the quote is verified, sends to the second device the encrypted first key. In some embodiments, the second key is a public key of a public/private key pair of the second device. In some embodiments, the method receives a public key certificate of the second key. In some embodiments, the public/private key pair of the second device is ephemeral. In some embodiments, the first key is a private key of a public/private key pair of the first device. In some embodiments, the method sends to the second device a public key certificate of the first device. In some embodiments, the second key is a symmetric key shared by the code of the secure enclave and the first device. In some embodiments, the second device is an edge server of a content delivery network and the first device is a key server of a customer of the content delivery network whose content is delivered by the content delivery network. In some embodiments, the first key is provided to a plurality of edge servers of the content delivery network so that each edge server can accept a Transport Layer Security ticket to resume a session regardless of which edge server generated the ticket. In some embodiments, the method, after sending the encrypted first key to the second device, receives from the second device a renewal request for the first key, and when a compromised criterion is not satisfied, sends to the second device a notification of renewal, and when the compromised criterion is satisfied, suppresses the sending of the notification of renewal. In some embodiments, the second device uses the first key to establish a Transport Layer Security session with a client on behalf of the owner of the first key.

In some embodiments, a computing system for obtaining a first key of a first device for performing a cryptographic action by a second device on behalf of an owner of the first key is provided. The method performs under control of a secure enclave of the second device. The method generates a quote attesting to code of the secure enclave. The method directs that the quote be sent to the first device. The method receives from the first device the first key of the first device, which is encrypted with a second key of the second device. The method decrypts the first key based on encryption with the second key. The method stores the decrypted first key within the secure enclave so that the decrypted first key is not accessible outside of the secure enclave. In some embodiments, the method further, under control of the secure enclave of the second device, receives from untrusted code of the second device a request to perform a cryptographic action on data, performs the cryptographic action on the data using the first key to generate resulting data, and provides the resulting data to the untrusted code. In some embodiments, the cryptographic action is either to decrypt or to encrypt data. In some embodiments, the cryptographic action is either create or to verify a digital signature. In some embodiments, the second key is a public key of a public/private key pair of the second device. In some embodiments, the method further sends to the first device a public key certificate for the second key. In some embodiments, the first key is a private key of a public/private key pair of the first device. In some embodiments, the method further receives a public key certificate of the first device. In some embodiments, the second key is a symmetric key shared by the code of the secure enclave and the first device. In some embodiments, the second device is an edge server of a content delivery network and the first device is a key server of a customer of the content delivery network whose content is delivered by the content delivery network. In some embodiments, the method, after receiving the first key, sends to the first device a renewal request for the first key, and when a notification of renewal is received, continues to use the first key, and when a notification of renewal is not received, suppresses use of the first key. In some embodiments, the code of the secure enclave is provisioned with access credential, and the method receives an encryption request to encrypt using the first key that includes a proffered credential, and when the proffered credential matches the access credential, performs the encryption using the first key. In some embodiments, the method, under control of the secure enclave, requests confirmation from the first device that the access credential is still valid, and when the confirmation is not received, suppresses the use of the access credential so that a subsequent encryption request that proffers the access credential will be denied.

In some embodiments, a method performed by a computing system for establishing by a second device a Transport Layer Security session with a client on behalf of an owner of a private key of a public/private key pair is provided. The method receives from the client a request to establish a session, the request including a client random. The method sends to the client a public key certificate of a public/private key pair and a server random. The method receives from the client an encrypted secret that is encrypted using the public key. The method requests a secure enclave of the computing system to decrypt the encrypted secret using the private key of a first device. The secure enclave may have obtained the private key from the first device based on a quote provided to the first device attesting that code of the secure enclave is trusted code. In some embodiments, the method receives from the secure enclave the decrypted secret and generates a session key for the session based on the client random, the server random, and the secret. In some embodiments, the requesting of the secure enclave further includes requesting the secure enclave to generate a session key based on the client random, the server random, and the secret and to store the session key. In some embodiments, the method requests the secure enclave to encrypt data of the session using the session key.

In some embodiments, a key server for providing a private key of the key server to an edge server for performing cryptographic actions on behalf of an owner of the private key when establishing a session with a client is provided. The key server comprises a computer-readable storage medium storing computer-executable instructions and a processor that executes the computer-executable instructions stored in the computer-readable storage medium. The instructions control the key sever to access a key of a secure enclave of the edge server. The instructions control the key sever to receive from the edge server a quote generated by the secure enclave of the edge server, the quote attesting to code of the secure enclave. The instructions control the key sever to verify the quote to ensure that the code of the secure enclave is trusted code. The instructions control the key sever to encrypt the private key using the key of the secure enclave of the edge server. The instructions control the key sever to, after the quote is verified, send to the edge server the encrypted private key. In some embodiments, the key of the edge server is a public key of a public/private key pair of the edge server. In some embodiments, the instructions control the key sever to receive a public key certificate for the public key of the edge server. In some embodiments, the instructions control the key sever to send a public key certificate for the public key corresponding to the private key of the key server. In some embodiments, the key of the edge server is a symmetric key shared by the code of the secure enclave and the key server. In some embodiments, the edge server is an edge server of a content delivery network and the key server is a key server of a customer of the content delivery network whose content is delivered by the content delivery network. In some embodiments, a session key is provided to a plurality of edge servers of the content delivery network so that each edge server can accept a Transport Layer Security ticket to resume a session regardless of which edge server generated the ticket. In some embodiments, the instructions control the key sever to, after sending the encrypted private key to the edge server: receive from the edge server a renewal request for the private key, and when a compromised criterion is not satisfied, send to the edge server a notification of renewal, and when the compromised criterion is satisfied, suppresses the sending of the notification of renewal. In some embodiments, the edge server uses the private key to establish a Transport Layer Security session with a client on behalf of the owner of the private key.

In some embodiments, an edge server for obtaining a private key of a key server for performing a cryptographic action on behalf of an owner of the private key when establishing a session with a client is provided. The edge server comprises a computer-readable storage medium storing computer-executable instructions and a processor that executes the computer-executable instructions stored in the computer-readable storage medium. The instructions control the edge server to generate a quote attesting to code of the secure enclave. The instructions control the edge server to direct that the quote be sent to the key server. The instructions control the edge server to receive from the key server the private key of the key server, which is encrypted with a key of the secure enclave of the edge server. The instructions control the edge server to decrypt the private key based on encryption with the key of the secure enclave of the edge server. The instructions control the edge server to store the decrypted private key within the secure enclave so that the decrypted private key is not accessible outside of the secure enclave. In some embodiments, the instructions control the edge server to, under control of the secure enclave of the edge server, receive from untrusted code of the edge server a request to decrypt encrypted data, decrypt the encrypted data using the private key, and provide the decrypted data to the untrusted code. In some embodiments, the instructions control the edge server to, under control of the secure enclave of the edge server: receive from untrusted code of the edge server a request to encrypt data, encrypt the data using the private key, and provide the encrypted data to the untrusted code. In some embodiments, the instructions control the edge server to, under control of the secure enclave of the edge server: receive from untrusted code of the edge server a request to generate a digital signature, encrypt the data using the private key, and provide the encrypted data to the untrusted code. In some embodiments, the instructions control the edge server to, under control of the secure enclave of the edge server: receive from untrusted code of the edge server a request to verify a digital signature, decrypt the data using the private key, and provide the decrypted data to the untrusted code. In some embodiments, the key of the secure enclave of the edge server is a public key of a public/private key pair of the secure enclave of the edge server. In some embodiments, the instructions control the edge server to, under control of the secure enclave of the edge server, send to the key server a public key of the secure enclave of the edge server. In some embodiments, the private key is a private key of a public/private key pair of the secure enclave of the key server. In some embodiments, the instructions control the edge server to, under control of the secure enclave of the edge server, receive a public key certificate of the public key of the key server. In some embodiments, the key of the edge server is a symmetric key shared by the code of the secure enclave and the key server. In some embodiments, the edge server is an edge server of a content delivery network and the key server is a key server of a customer of the content delivery network whose content is delivered by the content delivery network. In some embodiments, the instructions control the edge server to, under control of the secure enclave of the edge server: send to the key server a renewal request for the private key, and when a notification of renewal is received, continue to use the private key, and when a notification of renewal is not received, suppress use of the private key. In some embodiments, wherein the code of the secure enclave is provisioned with an access credential and wherein the computer-executable instructions further cause the edge server to, under control of the secure enclave of the edge server, receive a cryptography request that includes a proffered credential to perform a cryptographic action using the private key, and when the proffered credential matches the access credential, perform the cryptographic action using the private key. In some embodiments, the instructions control the edge server to, under control of the secure enclave of the edge server, request confirmation from the key server that the access credential is still valid, and when the confirmation is not received, suppress the use of the access credential so that a subsequent cryptographic request that proffers the access credential will be denied.

In some embodiments, an edge server for establishing a Transport Layer Security session with a client on behalf of an owner of a private key of a public/private key pair is provided. The edge server comprises a computer-readable storage medium storing computer-executable instructions and a processor that executes the computer-executable instructions stored in the computer-readable storage medium. The instructions control the edge server to receive from the client a request to establish a session. The request may include a client random. The instructions control the edge server to send to the client a public key certificate for a public/private key pair and a server random. The instructions control the edge server to receive from the client an encrypted pre-master secret that is encrypted using the public key. The instructions control the edge server to request trusted code of a secure enclave of the edge server to decrypt the encrypted pre-master secret using the private key. The secure enclave may have obtained the private key from a key server based on a quote, generated by the secure enclave and provided to the key server, attesting that code of the secure enclave is trusted code. In some embodiments, the instructions control the edge server to: receive from the secure enclave the decrypted pre-master secret and generate a session key for the session based on the client random, the server random, and the pre-master secret. In some embodiments, the instructions control the edge server to request the trusted code of the secure enclave to generate a session key based on the client random, the server random, and the pre-master secret and to store the session key. In some embodiments, the instructions control the edge server to request the secure enclave to decrypt data of the session using the session key.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system for providing a first key of a first device to a second device for performing a cryptographic action on behalf of an owner of the first key, the method comprising:
    accessing a second key of the second device, the second device is an edge server of a content delivery network and the first device is a key server of a customer of the content delivery network whose content is delivered by the content delivery network;
    receiving from the second device a quote generated by a secure enclave, the secure enclave is a hardware feature of a processor that controls execution of trusted code by:
        retrieving from memory encrypted trusted code and encrypted data;
        decrypting the trusted code and the data; and
        storing the decrypted trusted code and data in memory that is accessible only by the secure enclave;
    the quote attesting to code of the secure enclave;
    verifying the quote to ensure that the code of the secure enclave is trusted code;
    encrypting the first key using the second key; and
    after the quote is verified, sending to the second device the encrypted first key to establish sessions without roundtrip communications with a key server of the customer for each session.

2. The method of claim 1 wherein the second key is a public key of a public/private key pair of the second device.

3. The method of claim 2 further comprising receiving a public key certificate of the second key.

4. The method of claim 2 wherein the public/private key pair of the second device is ephemeral.

5. The method of claim 1 wherein the first key is a private key of a public/private key pair of the first device.

6. The method of claim 5 further comprising sending to the second device a public key certificate of the first device.

7. The method of claim 1 wherein the second key is a symmetric key shared by the code of the secure enclave and the first device.

8. The method of claim 1 wherein the first key is provided to a plurality of edge servers of the content delivery network so that each edge server can accept a Transport Layer Security ticket to resume a session regardless of which edge server generated the ticket.

9. The method of claim 1 further comprising, after sending the encrypted first key to the second device,
receiving from the second device a renewal request for the first key;
when a compromised criterion is not satisfied, sending to the second device a notification of renewal; and
when the compromised criterion is satisfied, suppressing the sending of the notification of renewal.

10. The method of claim 1 wherein the second device uses the first key to establish a Transport Layer Security session with a client on behalf of the owner of the first key.

11. A method performed by a computing system for obtaining a first key of a first device for performing a cryptographic action by a second device on behalf of an owner of the first key, the method comprising:
under control of a secure enclave of the second device, the secure enclave is a hardware feature of a processor that controls execution of trusted code by:
retrieving from memory encrypted trusted code and encrypted data;
decrypting the trusted code and the data; and
storing the decrypted trusted code and data in memory that is accessible only by the secure enclave;
the second device is an edge server of a content delivery network and the first device is a key server of a customer of the content delivery network whose content is delivered by the content delivery network,
generating a quote attesting to code of the secure enclave;
directing that the quote be sent to the first device;
receiving from the first device the first key of the first device, which is encrypted with a second key of the second device;
decrypting the first key based on encryption with the second key; and
storing the decrypted first key within the secure enclave so that the decrypted first key is not accessible outside of the secure enclave to establish sessions without roundtrip communications with a key server of the customer for each session.

12. The method of claim 11 further comprising:
under control of the secure enclave of the second device,
receiving from untrusted code of the second device a request to perform a cryptographic action on data;
performing the cryptographic action on the data using the first key to generate resulting data; and
providing the resulting data to the untrusted code.

13. The method of claim 11 wherein the cryptographic action is either to decrypt or to encrypt data.

14. The method of claim 11 wherein the cryptographic action is either create or to verify a digital signature.

15. The method of claim 11 wherein the second key is a public key of a public/private key pair of the second device.

16. The method of claim 15 further comprising sending to the first device a public key certificate for the second key.

17. The method of claim 11 wherein the first key is a private key of a public/private key pair of the first device.

18. The method of claim 17 further comprising receiving a public key certificate of the first device.

19. The method of claim 11 wherein the second key is a symmetric key shared by the code of the secure enclave and the first device.

20. The method of claim 11 further comprising, after receiving the first key,
sending to the first device a renewal request for the first key;
when a notification of renewal is received, continuing to use the first key; and
when a notification of renewal is not received, suppressing use of the first key.

21. The method of claim 11 wherein the code of the secure enclave is provisioned with access credential and further comprising receiving an encryption request to encrypt using the first key that includes a proffered credential, and when the proffered credential matches the access credential, performing the encryption using the first key.

22. The method of claim 21 further comprising, under control of the secure enclave, requesting confirmation from the first device that the access credential is still valid, and when the confirmation is not received, suppressing the use of the access credential so that a subsequent encryption request that proffers the access credential will be denied.

23. A method performed by a computing system for establishing by a second device a Transport Layer Security session with a client on behalf of an owner of a private key of a public/private key pair, the method comprising:
receiving from the client a request to establish a session, the request including a client random;
sending to the client a public key certificate of a public/private key pair and a server random;
receiving from the client an encrypted secret that is encrypted using the public key; and
requesting a secure enclave of the computing system to decrypt the encrypted secret using the private key of a first device, the secure enclave is a hardware feature of a processor that controls execution of trusted code by:
retrieving from memory encrypted trusted code and encrypted data;
decrypting the trusted code and the data; and
storing the decrypted trusted code and data in memory that is accessible only by the secure enclave;
the secure enclave having obtained the private key from the first device based on a quote provided to the first device attesting that code of the secure enclave is trusted code to establish sessions without roundtrip communications with a key server of the customer for each session, the first device is an edge server of a content delivery network.

24. The method of claim 23 further comprising:
receiving from the secure enclave the decrypted secret; and
generating a session key for the session based on the client random, the server random, and the secret.

25. The method of claim 23 wherein the requesting of the secure enclave further includes requesting the secure enclave to generate a session key based on the client random, the server random, and the secret and to store the session key.

26. The method of claim 25 further comprising requesting the secure enclave to encrypt data of the session using the session key.

27. A key server for providing a private key of the key server to an edge server for performing cryptographic actions on behalf of an owner of the private key when establishing a session with a client, the key server comprising:
a computer-readable storage medium storing computer-executable instructions that, when executed, cause the key server to:

access a key of a secure enclave of the edge server, the
secure enclave is a hardware feature of a processor
that controls execution of trusted code to:
retrieve from memory encrypted trusted code and
encrypted data;
decrypt the trusted code and the data; and
store the decrypted trusted code and data in memory
that is accessible only by the secure enclave;
the edge server is an edge server of a content delivery
network and the key server is a key server of a
customer of the content delivery network whose
content is delivered by the content delivery network;
receive from the edge server a quote generated by the
secure enclave of the edge server, the quote attesting
to code of the secure enclave;
verify the quote to ensure that the code of the secure
enclave is trusted code;
encrypt the private key using the key of the secure
enclave of the edge server; and
after the quote is verified, send to the edge server the
encrypted private key to establish sessions without
roundtrip communications with a key server of the
customer for each session; and
a processor that executes the computer-executable
instructions stored in the computer-readable storage
medium.

28. The key server of claim 27 wherein the key of the edge server is a public key of a public/private key pair of the edge server.

29. The key server of claim 28 wherein the computer-executable instructions further cause the key server to receive a public key certificate for the public key of the edge server.

30. The key server of claim 27 wherein the computer-executable instructions further cause the key server to send a public key certificate for the public key corresponding to the private key of the key server.

31. The key server of claim 27 wherein the key of the edge server is a symmetric key shared by the code of the secure enclave and the key server.

32. The key server of claim 27 wherein an encryption key is provided to a plurality of edge servers of the content delivery network so that each edge server can accept a Transport Layer Security ticket to resume a session regardless of which edge server generated the ticket.

33. The key server of claim 27 wherein the computer-executable instructions further cause the key server to, after sending the encrypted private key to the edge server,
receive from the edge server a renewal request for the private key;
when a compromised criterion is not satisfied, send to the edge server a notification of renewal; and
when the compromised criterion is satisfied, suppressing the sending of the notification of renewal.

34. The key server of claim 27 wherein the edge server uses the private key to establish a Transport Layer Security session with a client on behalf of the owner of the private key.

35. An edge server for obtaining a private key of a key server for performing a cryptographic action on behalf of an owner of the private key when establishing a session with a client, the edge server comprising:
a computer-readable storage medium storing computer-executable instructions that, when executed, cause the edge server to, under control of a secure enclave of the edge server, the secure enclave is a hardware feature of a processor that controls execution of trusted code to:
retrieve from memory encrypted trusted code and encrypted data;
decrypt the trusted code and the data; and
store the decrypted trusted code and data in memory that is accessible only by the secure enclave;
the edge server is an edge server of a content delivery network and the key server is a key server of a customer of the content delivery network whose content is delivered by the content delivery network,
generate a quote attesting to code of the secure enclave;
direct that the quote be sent to the key server;
receive from the key server the private key of the key server, which is encrypted with a key of the secure enclave of the edge server;
decrypt the private key based on encryption with the key of the secure enclave of the edge server; and
store the decrypted private key within the secure enclave so that the decrypted private key is not accessible outside of the secure enclave to establish sessions without roundtrip communications with a key server of the customer for each session; and
a processor that executes the computer-executable instructions stored in the computer-readable storage medium.

36. The edge server of claim 35 wherein the computer-executable instructions further cause the edge server to, under control of the secure enclave of the edge server,
receive from untrusted code of the edge server a request to decrypt encrypted data;
decrypt the encrypted data using the private key; and
provide the decrypted data to the untrusted code.

37. The edge server of claim 35 wherein the computer-executable instructions further cause the edge server to, under control of the secure enclave of the edge server,
receive from untrusted code of the edge server a request to encrypt data;
encrypt the data using the private key; and
provide the encrypted data to the untrusted code.

38. The edge server of claim 35 wherein the computer-executable instructions further cause the edge server to, under control of the secure enclave of the edge server,
receive from untrusted code of the edge server a request to generate a digital signature;
encrypt the data using the private key; and
provide the encrypted data to the untrusted code.

39. The edge server of claim 35 wherein the computer-executable instructions further cause the edge server to, under control of the secure enclave of the edge server,
receive from untrusted code of the edge server a request to verify a digital signature;
encrypt the data using the private key; and
provide the encrypted data to the untrusted code.

40. The edge server of claim 35 wherein the key of the secure enclave of the edge server is a public key of a public/private key pair of the secure enclave of the edge server.

41. The edge server of claim 40 wherein the computer-executable instructions further cause the edge server to, under control of the secure enclave of the edge server, send to the key server a public key of the secure enclave of the edge server.

42. The edge server of claim 37 wherein the private key is a private key of a public/private key pair of the secure enclave of the key server.

43. The edge server of claim 42 wherein the computer-executable instructions further cause the edge server to, under control of the secure enclave of the edge server, receive a public key certificate of the public key of the key server.

44. The edge server of claim 35 wherein the key of the edge server is a symmetric key shared by the code of the secure enclave and the key server.

45. The edge server of claim 35 wherein the computer-executable instructions further cause the edge server to, under control of the secure enclave of the edge server,
send to the key server a renewal request for the private key;
when a notification of renewal is received, continue to use the private key; and
when a notification of renewal is not received, suppress use of the private key.

46. The edge server of claim 35 wherein the code of the secure enclave is provisioned with an access credential and wherein the computer-executable instructions further cause the edge server to, under control of the secure enclave of the edge server, receive a cryptography request that includes a proffered credential to perform a cryptographic action using the private key, and when the proffered credential matches the access credential, perform the cryptographic action using the private key.

47. The edge server of claim 46 wherein the computer-executable instructions further cause the edge server to, under control of the secure enclave of the edge server, request confirmation from the key server that the access credential is still valid, and when the confirmation is not received, suppress the use of the access credential so that a subsequent cryptographic request that proffers the access credential will be denied.

48. An edge server for establishing a Transport Layer Security session with a client on behalf of an owner of a private key of a public/private key pair, the edge server comprising:
a computer-readable storage medium storing computer-executable instructions that, when executed, cause the edge server to:
receive from the client a request to establish a session, the request including a client random;
send to the client a public key certificate for a public/private key pair and a server random;
receive from the client an encrypted pre-master secret that is encrypted using the public key; and
request trusted code of a secure enclave of the edge server to decrypt the encrypted pre-master secret using the private key, the secure enclave is a hardware feature of a processor that controls execution of trusted code to:
retrieve from memory encrypted trusted code and encrypted data;
decrypt the trusted code and the data; and
store the decrypted trusted code and data in memory that is accessible only by the secure enclave;
the secure enclave having obtained the private key from a key server based on a quote, generated by the secure enclave and provided to the key server, attesting that code of the secure enclave is trusted code, the edge server is an edge server of a content delivery network and the key server is a key server of a customer of the content delivery network whose content is delivered by the content delivery network to establish sessions without roundtrip communications with a key server of the customer for each session; and
a processor that executes the computer-executable instructions stored in the computer-readable storage medium.

49. The edge server of claim 48 wherein the computer-executable instructions further cause the edge server to:
receive from the secure enclave the decrypted pre-master secret; and
generate a session key for the session based on the client random, the server random, and the pre-master secret.

50. The edge server of claim 48 wherein the computer-executable instructions that request the trusted code further cause the edge server to request the trusted code of the secure enclave to generate a session key based on the client random, the server random, and the pre-master secret and to store the session key.

51. The edge server of claim 50 wherein the computer-executable instructions further cause the edge server to request the secure enclave to encrypt data of the session using the session key.

* * * * *